A. W. ENGEL.
GUMMED SEAL.
APPLICATION FILED AUG. 29, 1919.
1,351,559. Patented Aug. 31, 1920.
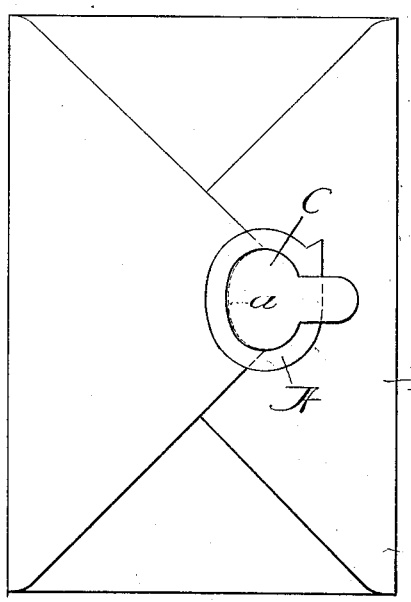
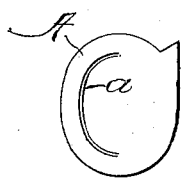
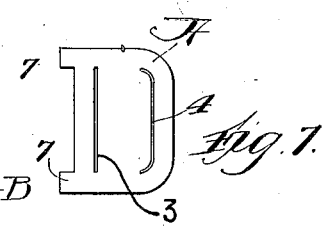
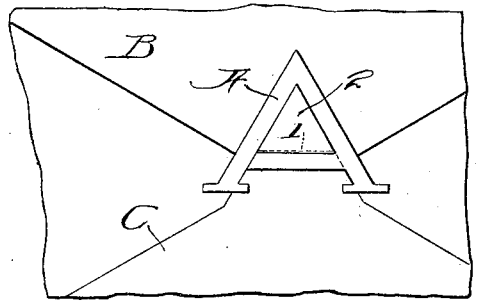
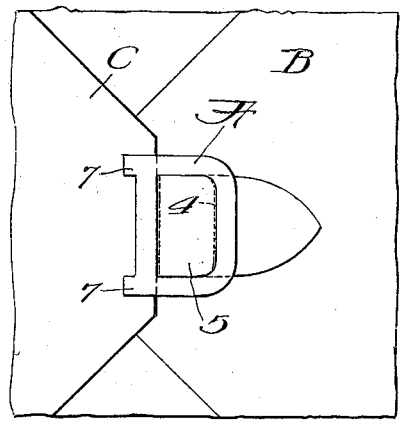
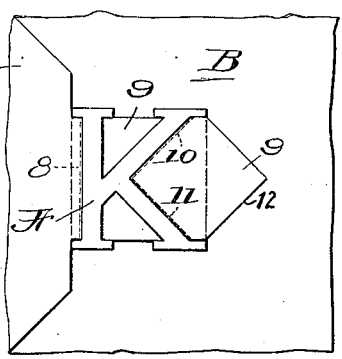

UNITED STATES PATENT OFFICE.

ALBERT W. ENGEL, OF CHICAGO, ILLINOIS.

GUMMED SEAL.

1,351,559. Specification of Letters Patent. Patented Aug. 31, 1920.

Application filed August 29, 1919. Serial No. 320,707.

*To all whom it may concern:*

Be it known that I, ALBERT W. ENGEL, a citizen of the United States, residing at Chicago, in the county of Cook and the State of Illinois, have invented certain new and useful Improvements in Gummed Seals, of which the following is a specification, reference being had to the accompanying drawings, forming a part thereof.

The purpose of this invention is to provide an improved form of gummed seal for sealing envelops and the like, a specific purpose being to cause the seal when applied and engaged with the envelop flap to present the form of any desired monogram. It consists in the elements and features of construction shown and described, as indicated in the claims.

In the drawings:

Figure 1 is a plan view of the sealed side of an envelop provided with a seal embodying this invention.

Figs. 2, 3 and 4 are plan views of seals embodying this invention, presenting monograms shown in conjunction with the flap portion of the envelop secured thereby, and by association therewith the monogram form is produced.

Figs. 5, 6, 7 and 8 are plan views of the several seals shown in Figs. 1, 2, 3 and 4, unattached.

The simplest form of this invention, without regard to the purpose of producing a monogram appearance, is embodied in a seal consisting of a piece of material, A, gummed upon one surface, having a slit, *a*, through which the angular or otherwise narrowed flap, C, of an envelop may be inserted so that the gummed surface of the seal at one side of the slit is presented to and adapted to adhere to the outer surface of the flap, while the gummed surface at the inner side of the slit is presented to and adapted to adhere to the surface of the body, B, of the envelop. Preferably the angle of the flap corner which is to be inserted through the slit of the seal is relatively sharp,—not greater than right angle,—and the size of the seal and the length of the slit, and the width of the portion of the seal at the side of the slit outside of which the inserted flap lies are so dimensioned that the inserted angular terminal of the flap extends beyond the overlapped portion of the seal, and if the margin of the flap is gummed, it will have opportunity to adhere to the body of the envelop beyond the seal, thus locking the seal in place in addition to its securement by adhesion.

One of the most desirable adaptations of this invention consists in forming the seal and the envelop flap, and locating the slit or slits in the seal, so that the portion of the envelop flap which overlies the seal when the flap is inserted through the slit or slits, corresponds to an interspace between the lines of the monogram presented by the seal; thus, not only leaving the monogram exposed when secured by the engagement of the flap with the seal, but even clarifying or accentuating or presenting more clearly the monogram by reason of such engagement.

A simple instance of the embodiment of this invention in a monogram seal is presented in Fig. 2, where the monogram is the capital letter, A, the form of this letter requiring only the single slit, 1, through which the angular terminal lug, 2, of the envelop flap is inserted from the back or gummed side of the seal, lapping over the triangular area above the cross of the A between its two sides. The lug is in this case first introduced at the gummed or inner side of the seal, under the inwardly-projecting ceriphs of the side limbs of the letter, A, and under the cross-bar in order to be inserted as above stated through the slit, 1, from the back or gummed side. In this way, not only the cross bar, but also the ceriphs mentioned engage outside of the envelop flap.

A simple instance of the employment of two slits through which the terminal of the envelop flap is inserted, through the first from one side and through the second on the opposite side of the seal, is presented in the capital letter, D, in which the seal has the slits, 3 and 4, at the opposite edges of the inclosed aperture of the capital letter, the lug, 5, which terminates the flap, C, of the envelop, having its width substantially equal to the length of the slits, and being inserted through the slit, 3, up to the shoulder or angle between the lug and the forward edge of the flap, the ceriph terminals, 7, 7, of the letter overlapping the flap at the portion of the edges adjacent to the two sides of the lug.

A somewhat more intricate design embodying the invention and requiring more than two slits, is shown in the adaptation of it to the monogram, capital letter, K, in Fig. 4. In this instance, the monogram has a vertical slit, 8, in the vertical stem of the letter, and two slits, 10 and 11, meeting at an angle defining the two inner or converging edges of the two characteristic limbs of the letter, the lug, 9, of the envelop flap has at its base or junction with the body of the flap a width substantially equal to the length of the slit, 8, and is diminished in width near its angular terminal, 12, to a distance equal to the distance between the opposite ends of the two slits, 10 and 11. It will be seen that when the lug is inserted from the forward or face side of the seal through the slit, 8, and then back from the rear or gummed side of the seal through the slits, 10 and 11, and drawn through until stopped by the shoulder at the base of the lug encountering the left hand elge of vertical stem of the letter, the portion of the seal face which the lug conceals, consists only of interspace between the proper lines of the monogram to be presented.

The adaptation of the invention to various letters of the alphabet and to various monograms will be understood from the above instances without further elaboration.

I claim:

1. An envelop sealing device consisting of a flap having a relatively narrow terminal, in combination with a seal for the envelop consisting of a sheet of material having a slit through which the terminal of the flap extends, the flap being gummed at its inner side to the end of the terminal, and the dimensions of the seal, the length of the slit and the width of the terminal being so proportioned that the terminal protruding through the slit extends beyond the portion of the seal which is overlapped for adhering to the envelop body beyond the seal.

2. A monogram seal of sheet material, gummed on one surface and having a slit through which a flap to be secured may be inserted on the inner or gummed side of the seal, so as to expose on the outer side of the seal a portion of the inserted terminal of the flap, the said exposed portion of the flap being formed to occupy an interspace between the lines of the monogram.

3. A monogram envelop seal consisting of sheet material gummed on one surface, and slitted for insertion through it of the terminal of the envelop flap, the slitting being so positioned that the area of the seal covered by the inserted flap is an area of interspace between the lines of the monogram.

In testimony whereof, I have hereunto set my hand at Chicago, Illinois, this 22d day of August, 1919.

ALBERT W. ENGEL.